United States Patent
Lee

(10) Patent No.: US 9,650,072 B2
(45) Date of Patent: May 16, 2017

(54) METHOD FOR CONTROLLING STEERING WHEEL AND SYSTEM THEREFOR

(71) Applicant: Hyundai Mobis Co., Ltd., Seoul (KR)

(72) Inventor: Seong Soo Lee, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 370 days.

(21) Appl. No.: 14/256,439

(22) Filed: Apr. 18, 2014

(65) Prior Publication Data

US 2015/0073660 A1  Mar. 12, 2015

(30) Foreign Application Priority Data

Sep. 6, 2013 (KR) ........................ 10-2013-0106904

(51) Int. Cl.
*B62D 15/02* (2006.01)
*B60R 1/00* (2006.01)
*G06K 9/00* (2006.01)

(52) U.S. Cl.
CPC ............ *B62D 15/0285* (2013.01); *B60R 1/00* (2013.01); *G06K 9/00812* (2013.01)

(58) Field of Classification Search
CPC ............... G08G 1/168; G06K 9/00812; G06K 9/00798; G06K 9/00805; B62D 15/027;

(Continued)

(56) References Cited

U.S. PATENT DOCUMENTS 5,961,571 A * 10/1999 Gorr ...................... G01S 3/783
340/988
9,251,587 B2 * 2/2016 Friend ................... G06T 7/0042
(Continued)

FOREIGN PATENT DOCUMENTS

JP         08-050699         2/1996
JP         2008-241446        10/2008
(Continued)

OTHER PUBLICATIONS

Korean Office Action issued on Sep. 4, 2014 in counterpart Korean Application No. 10-2013-0106904 (5 pages, in Korean).

(Continued)

*Primary Examiner* — Thomas G Black
*Assistant Examiner* — Sze-Hon Kong
(74) *Attorney, Agent, or Firm* — NSIP Law

(57) ABSTRACT

Provided are a method for controlling a steering wheel and an apparatus therefore; for example, a method using an AVM composite image and a distance sensing sensor based parking support system. For example, a method for controlling a steering wheel, includes: detecting a parking line and at least two intersecting points intersecting the parking line from a first image obtained by composing images input from a plurality of cameras equipped in a vehicle; detecting a rotating amount and a moving amount of the vehicle from the first image and a second image continued to the first image; compensating for a rotating angle error and a moving error of the vehicle from the detected rotating amount and moving amount; constructing an obstacle map by reflecting the compensated rotating angle error and moving error; and controlling the steering wheel based on the constructed obstacle map.

12 Claims, 11 Drawing Sheets

(58) Field of Classification Search
CPC . B62D 15/0285; B62D 15/025; B60W 30/06; B60R 2300/8093; B60R 1/00; H04N 13/0221

See application file for complete search history.

(56) References Cited

U.S. PATENT DOCUMENTS

| | | | |
|---|---|---|---|
| 9,262,683 B2* | 2/2016 | Takeuchi | G06K 9/00785 |
| 2001/0006554 A1* | 7/2001 | Kakinami | G01S 11/12 |
| | | | 382/104 |
| 2002/0123829 A1* | 9/2002 | Kuriya | B62D 15/0275 |
| | | | 701/1 |
| 2004/0221790 A1* | 11/2004 | Sinclair | G01C 22/02 |
| | | | 116/62.1 |
| 2004/0260439 A1* | 12/2004 | Endo | B60Q 1/48 |
| | | | 701/36 |
| 2005/0163343 A1* | 7/2005 | Kakinami | G06K 9/00812 |
| | | | 382/103 |
| 2006/0136109 A1* | 6/2006 | Tanaka | B60W 40/04 |
| | | | 701/41 |
| 2007/0206833 A1* | 9/2007 | Otsuka | B60R 21/0134 |
| | | | 382/103 |
| 2008/0205706 A1* | 8/2008 | Hongo | B60R 1/00 |
| | | | 382/104 |
| 2009/0207045 A1* | 8/2009 | Jung | G06T 7/0044 |
| | | | 340/932.2 |
| 2010/0220173 A1* | 9/2010 | Anguelov | G06T 7/004 |
| | | | 348/36 |
| 2010/0231416 A1* | 9/2010 | Wu | G08G 1/168 |
| | | | 340/932.2 |
| 2011/0074957 A1* | 3/2011 | Kiyohara | G06K 9/342 |
| | | | 348/148 |
| 2012/0116664 A1* | 5/2012 | Shibata | B60W 30/16 |
| | | | 701/300 |
| 2012/0197439 A1* | 8/2012 | Wang | B25J 9/1689 |
| | | | 700/259 |
| 2012/0213443 A1* | 8/2012 | Shin | G05D 1/0246 |
| | | | 382/190 |
| 2012/0219207 A1* | 8/2012 | Shin | B25J 9/162 |
| | | | 382/153 |
| 2014/0236412 A1* | 8/2014 | Sung | B62D 15/0285 |
| | | | 701/23 |
| 2014/0244070 A1* | 8/2014 | Inagaki | B62D 15/0285 |
| | | | 701/1 |
| 2014/0350839 A1* | 11/2014 | Pack | G01C 21/30 |
| | | | 701/409 |

FOREIGN PATENT DOCUMENTS

| | | |
|---|---|---|
| KR | 10-2008-0109871 | 12/2008 |
| KR | 10-2013-0073256 | 7/2013 |

OTHER PUBLICATIONS

Suhr, Jae Kyu, and Ho Gi Jung. "Parking Slot Marking Recognition in Around View Monitor Image Sequences." *KSAE Conference*, May 2012. (4 pages, in Korean).

* cited by examiner

FIG. 3
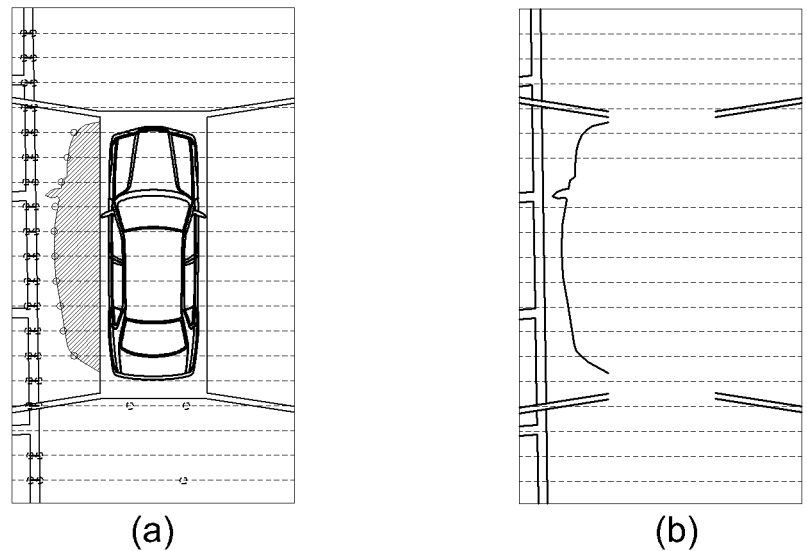
(a)  (b)
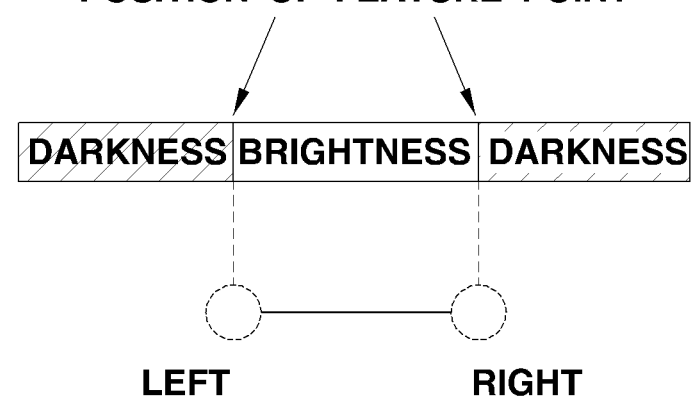
(c)

(a)          (b)          (c)

FIG. 5
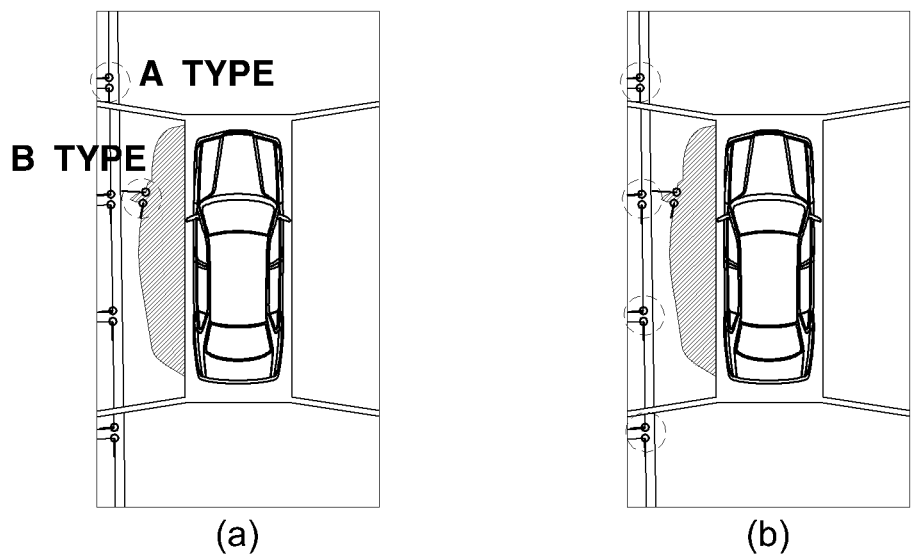
(a)             (b)
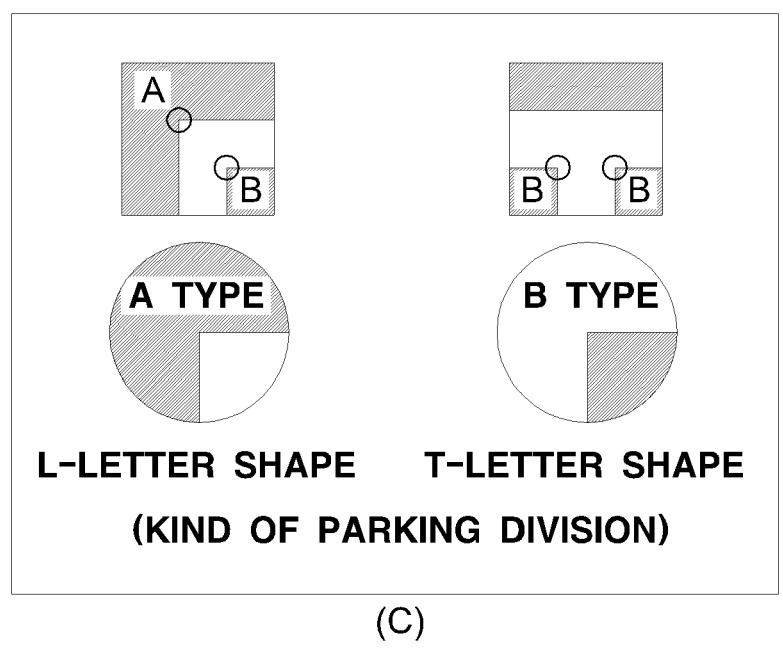
(C)

FIG. 6
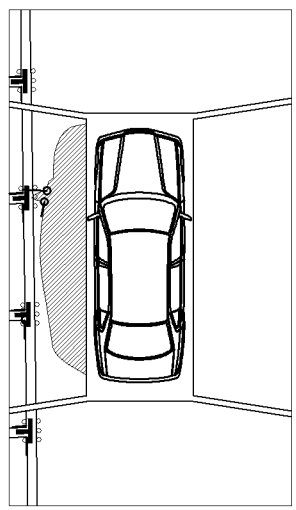
(a)
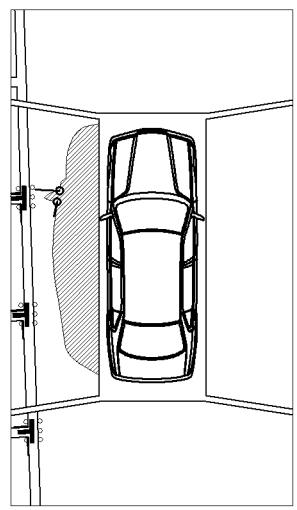
(b)

FIG. 7
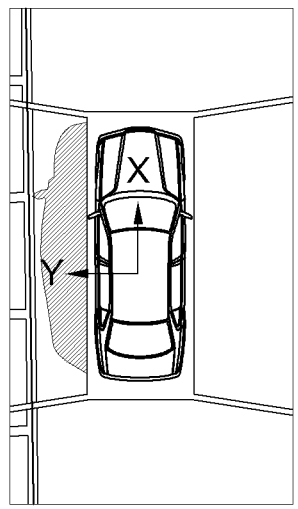
(a)
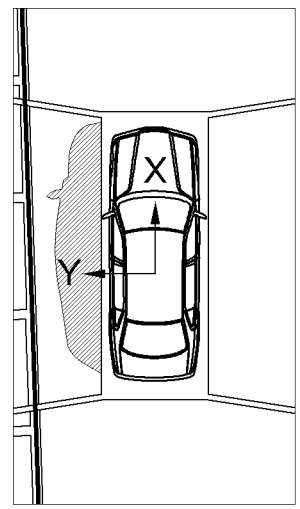
(b)
CALCULATE ANGLE DIFFERENCE BETWEEN TWO PARKING LINES = ROTATING ANGLE OF ITS OWN VEHICLE
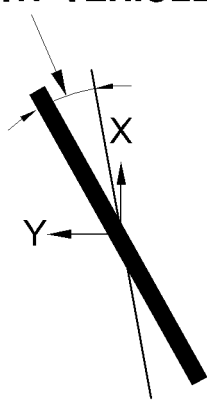
(c)

(a)   (b)

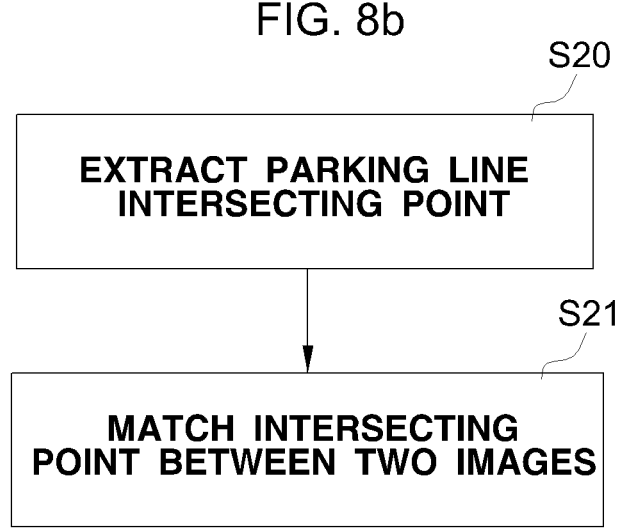

(a)  (b)

METHOD FOR CONTROLLING STEERING WHEEL AND SYSTEM THEREFOR

CROSS-REFERENCE TO RELATED APPLICATION

This application claims priority to and the benefit of Korean Patent Application No. 10-2013-0106904 filed in the Korean Intellectual Property Office on Sep. 6, 2013, the entire contents of which are incorporated herein by reference.

TECHNICAL FIELD

The present invention relates to a method for controlling a steering wheel and an apparatus therefor, and more particularly, to a method for controlling a steering wheel and a system therefor using an AVM composite image and a distance sensing sensor based parking support system.

BACKGROUND OF THE INVENTION

An inexperienced driver or an aged driver may have much difficulty in parking a vehicle, in particular, in a narrow space, and therefore a demand for a parking support system has increased. With the demand of a market and the recent increase in a vehicle in which a motor-driven power steering (MDPS) is equipped, the use of an ultrasonic based parking support system to relieve a driver's burden and improve driver convenience with a low cost has been increased.

As described above, according to the related art, in order to recognize a parking division space using an ultrasonic sensor, another vehicle or an obstacle beside the parking division space is required, or otherwise the accuracy of recognition of a valid parking division space may be reduced.

Further, a logic which is most fundamental in the parking support system according to the related art is a vehicle position estimator and a differential odometry scheme using rear wheel sensor data of a vehicle has been mainly used, in which the differential odometry may have reduced accuracy of recognizing the valid parking division space due to variables such as a vehicle specification and a road surface state.

An error in posture estimation of the odometry is called a systematic error, which corresponds to a deterministic error by the vehicle. An example of the cause of the systematic error may include a mismatch of two wheel diameters, a misalignment of the wheels, a kinematic modeling error, and the like.

Meanwhile, an apparatus for selecting a region of interest in an image provided from a means for detecting an image based parking division line based on an obstacle map, which is generated by a means for sensing an obstacle, to detect a parking division line, by using the means for sensing an obstacle and the means for detecting an image based parking division line is described in detail in European Patent No. EP2377728. As such, according to the related art, a method for determining a valid parking division based on the obstacle map when the detection of the image based parking division line fails, is described in detail and when the vehicle position estimation error is increased depending on the variables of the vehicle specification and the road surface state, the method may reduce the accuracy and recognition rate of a valid parking division.

When the vehicle position estimation error depending on the variables of the vehicle specification and the road surface state is increased, the error of the parking alignment may be increased during the parking. However, the related art does not yet provide a solution of the problems.

SUMMARY OF THE INVENTION

The present invention has been made in an effort to improve performance of a parking support system by accurately constructing an obstacle map required to recognize a valid parking division by compensating for a vehicle motion error.

An exemplary embodiment of the present invention provides a method for controlling a steering wheel, including: detecting a parking line and at least two intersecting points intersecting the parking line from a first image obtained by composing images input from a plurality of cameras equipped in a vehicle; detecting a rotating amount and a moving amount of a vehicle from the first image and a second image continued to the first image; compensating for a rotating angle error and a moving error of the vehicle from the detected rotating amount and moving amount; constructing an obstacle map by reflecting the compensated rotating angle error and moving error; and controlling the steering wheel based on the constructed obstacle map.

Another exemplary embodiment of the present invention provides an apparatus for controlling a steering wheel, including: an around view monitor (AVM) system configured to include a plurality of cameras equipped in a vehicle and compose and display images input from the cameras; an obstacle map constructing system configured to detect a parking line and at least two intersecting points intersecting the parking line from a first image obtained by composing images input from the plurality of cameras, detect a rotating amount and a moving amount of the vehicle from the first image and a second image continued to the first image, compensate for a rotating angle error and a moving error of the vehicle from the detected rotating amount and moving amount, and reflect the compensated rotating angle error and moving error; and a steering wheel system configured to control the steering wheel based on the constructed obstacle map.

According to the exemplary embodiments of the present invention, it is possible to reduce the vehicle position estimation error by detecting a parking line and a parking line intersecting point based on the AVM composite image.

Further, it is possible to improve the performance of the parking support system by accurately constructing the obstacle map required to recognize the valid parking division by compensating for the motion error.

BRIEF DESCRIPTION OF THE DRAWINGS

FIGS. 3A to 3C are block diagrams illustrating a process of extracting candidate points having parking line brightness pattern characteristics to detect the parking lines illustrated in FIG. 1 according to the exemplary embodiment of the present invention.

FIGS. 5A to 5C are block diagrams illustrating a method for detecting a parking line intersecting point illustrated in FIG. 1 according to an exemplary embodiment of the present invention.

FIGS. 6A and 6B are block diagrams illustrating test results of the method for detecting a parking line intersecting point illustrated in FIG. 1 according to the exemplary embodiment of the present invention.

FIGS. 7A to 7C are block diagrams illustrating a method for compensating for a rotating error of its own vehicle according to an exemplary embodiment of the present invention.

FIGS. 8A to 8D are block diagrams and flow charts illustrating the method for compensating for a moving error of its own vehicle according to an exemplary embodiment of the present invention.

DETAILED DESCRIPTION OF THE EMBODIMENTS

Advantages and features of the present invention and a method achieving them will be more obvious with reference to exemplary embodiments to be described below in detail with reference to the accompanying drawings. However, exemplary embodiments introduced herein are provided to make disclosed contents thorough and complete and sufficiently transfer the spirit of the present invention to those skilled in the art and the present invention is defined only by the scope of the appended claims. Terms used in the present specification are for explaining the embodiments rather than limiting the present invention. Unless explicitly described to the contrary, a singular form includes a plural form in the present specification. The word "comprise" and/or "comprising" used in the present specification will be understood to imply the inclusion of stated constituents, steps, operations and/or elements but not the exclusion of any other constituents, steps, operations and/or elements.

The present invention relates to a method for improving performance of a parking support system by accurately constructing an obstacle map required to recognize a valid parking division, by compensating for a vehicle motion error by detecting a parking line and a parking line intersecting point from an image composed by an around view monitoring (AVM) system which receives images from a plurality of cameras as an input and then continuously measuring a rotating amount of parking lines and a moving amount of parking line intersecting point between images, when a vehicle is parked using the AVW system and the parking support system.

Figure 1:
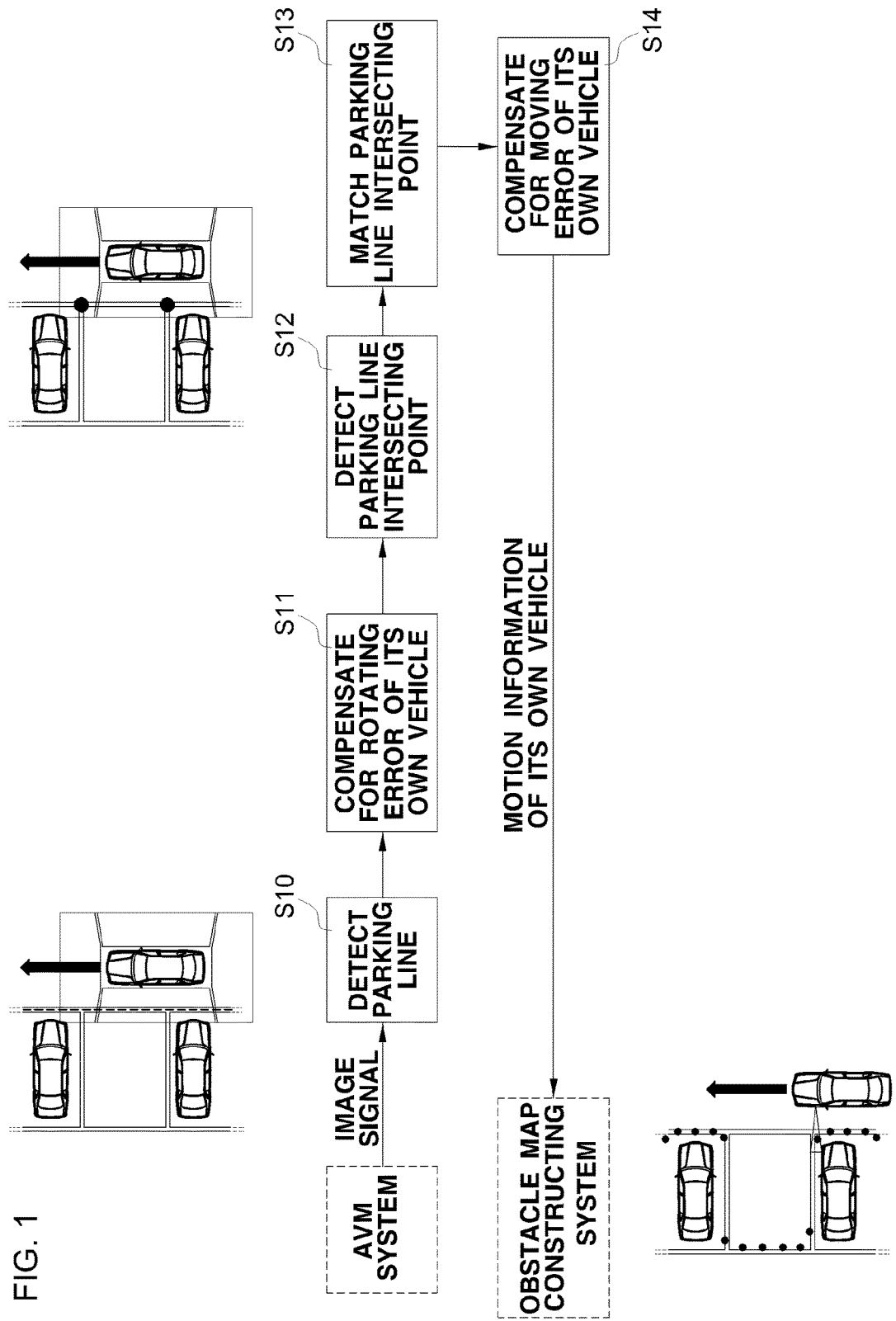
FIG. 1 is a flow chart illustrating a process of constructing an obstacle map for recognizing a parking division according to an exemplary embodiment of the present invention.

FIG. 1 is a flow chart illustrating a process of constructing an obstacle map for recognizing a parking division according to an exemplary embodiment of the present invention.

Referring to FIG. 1, the system for constructing an obstacle map detects the parking lines and at least two intersecting points intersecting the parking lines from a first image which is obtained by composing images input from the plurality of cameras which are equipped in a vehicle (S10 and S12).

The system for constructing an obstacle map detects a rotating amount and a moving amount of the vehicle from the first image and a second image continued to the first image. A rotating angle error and a moving error of the vehicle are compensated for by the detected rotating amount and moving amount (S11 and S14).

Further, the parking lines are detected from the first image and the second image (S10) and the rotating angle, that is, the rotating amount between the parking lines is detected (S11). The rotating error of the vehicle may be compensated for by the detected rotating amount. Next, at least two intersecting points may be detected from each of the first image and second image (S12), the moving amount of the intersecting points of each image may be detected by matching the detected intersecting points (S13), and the moving error of the vehicle may be compensated for by the detected moving amount (S14).

The system for constructing an obstacle map generates motion information of the vehicle by reflecting the compensated rotating angle error and moving error and constructs the obstacle map based on the motion information.

An apparatus for controlling a steering wheel controls a steering wheel based on the constructed obstacle map.

The system for constructing an obstacle map detects the parking lines using each of the first image and second image and detects the rotating amount of the vehicle from a difference in an angle between the parking lines. The process of detecting a rotating amount will be described in detail with reference to FIGS. 7A to 7C.

The system for constructing an obstacle map rotates and transforms any one of at least two first intersecting points intersecting the parking lines detected from the first image and at least two second intersecting points intersecting the parking lines detected from the second image to remove rotating components and then detects the moving amount of the first intersecting points and the second intersecting points. The process of detecting a moving amount will be described in detail with reference to FIGS. 8A to 8D.

Figure 2:
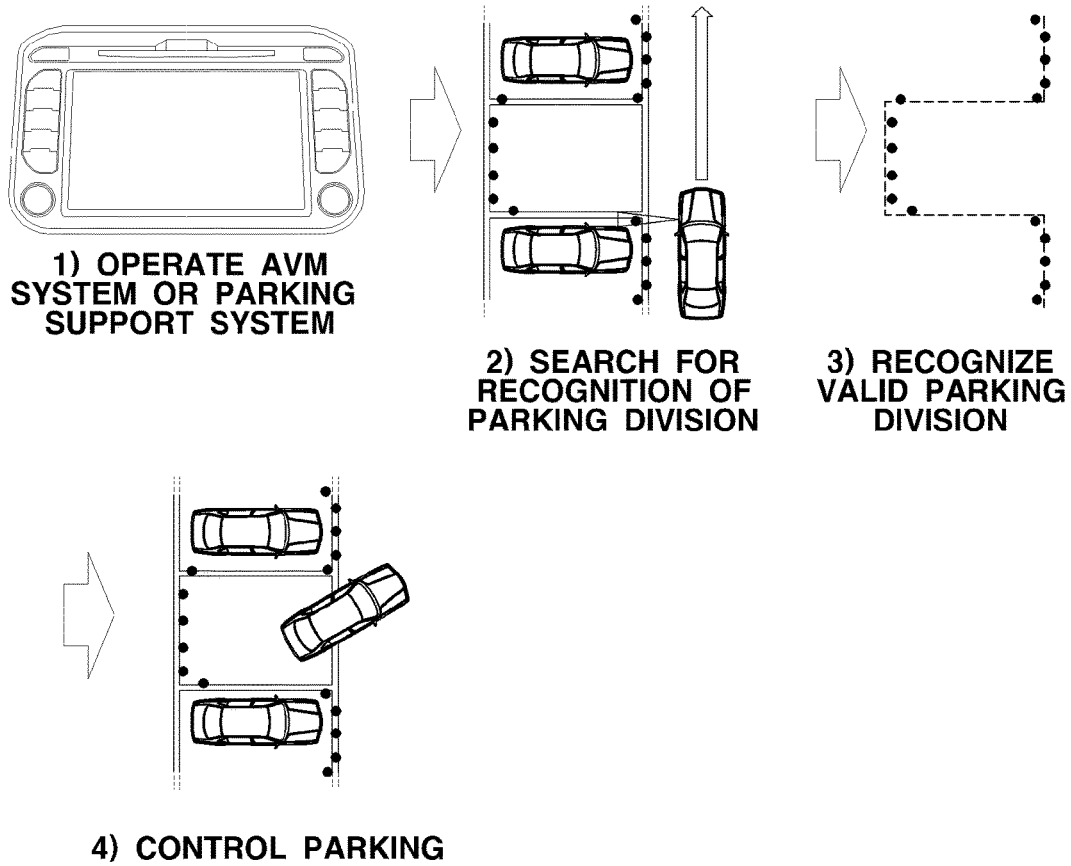
FIG. 2 is a flow chart illustrating a parking process based on the obstacle map constructed in FIG. 1 according to the exemplary embodiment of the present invention.

FIG. 2 is a flow chart illustrating a parking process based on the obstacle map constructed in FIG. 1 according to the exemplary embodiment of the present invention.

Referring to FIG. 2, when the AVM system or the parking support system is operated, a search for parking division recognition starts. For example, the plurality of images are received from the plurality of cameras and the system for constructing an obstacle map updates an obstacle map using the parking lines and the parking line intersecting points detected from a composite image of the images. A valid parking division is recognized based on the updated map and the steering wheel control is performed to park a vehicle in the recognized valid parking division.

FIGS. 3A to 3C are block diagrams illustrating a process of extracting candidate points having parking line brightness pattern characteristics to detect the parking lines illustrated in FIG. 1 according to the exemplary embodiment of the present invention.

Referring to FIGS. 3A to 3C, horizontal sections to be searched are selected as illustrated in images of FIGS. 3A and 3B to search for target image feature points (herein, to detect dark lines searching for a parking line and a predetermined area having predetermined brightness between the dark lines) illustrated in FIG. 3C. In a contour image of FIG. 3A, a place having a relatively high gradient is detected by being searched in a horizontal direction and thus is defined as the feature point. A candidate point is extracted by combining and generating two candidate points having parking line brightness pattern characteristics in each region of interest. The parking line brightness pattern characteristics indicate when a bright area having a predetermined size between the dark lines is present.

Figure 4:
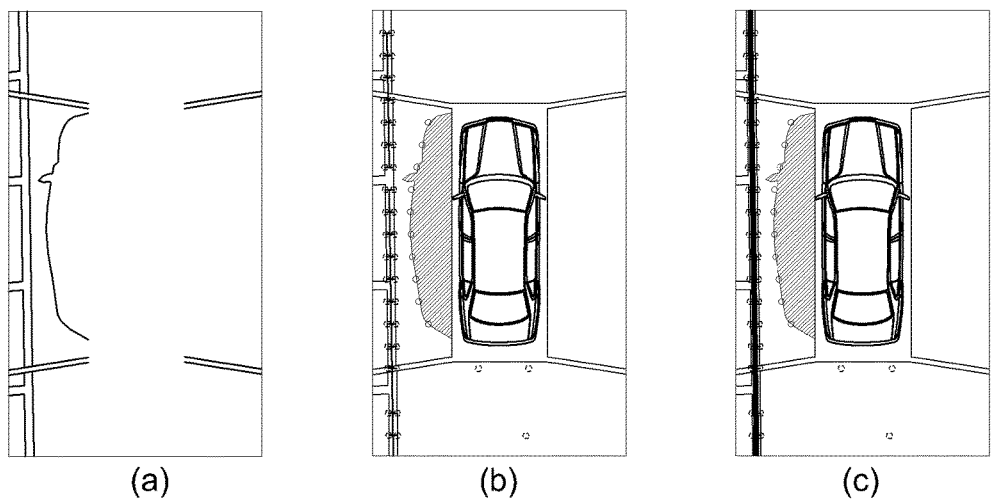
FIGS. 4A to 4C are block diagrams illustrating a process of using a line fitting algorithm to detect the parking lines illustrated in FIG. 1 according to the exemplary embodiment of the present invention.

FIGS. 4A to 4C are block diagrams illustrating a process of using a line fitting algorithm to detect the parking lines illustrated in FIG. 1 according to the exemplary embodiment of the present invention.

As illustrated in FIGS. 4A and 4B, a line component is extracted by searching for a 360° direction based on a candidate point (left/right) having the parking line brightness patterns in the contour image. Like a thick red line illustrated in FIG. 4C, the line component which passes through the plurality of candidate points is recognized as a guide line of a final parking line.

FIGS. 5A to 5C are block diagrams illustrating a method for detecting parking line intersecting points illustrated in FIG. 1 according to an exemplary embodiment of the present invention.

Referring to FIGS. 5A to 5C, an intersecting point feature point is extracted using a Harris parking line intersecting point detection algorithm, and the like. In FIG. 5A, the Harris parking line intersecting point detection algorithm is basically implemented by a scheme of analyzing a change in pixel values within a window which moves vertically and horizontally within an image and searching for the parking line intersecting points. When a brightness value of an object within the image is not changed, no variation of the pixel value is present even though the window moves in the vertical and horizontal directions. However, when the window meets a boundary line of the images which are present vertically, while moving horizontally, the pixel values within the window moving horizontally are largely changed but the pixel values of the window moving vertically are not changed. Next, considering that the window moves horizontally and vertically, the window clearly passes through a point at which the change in the pixel value is large while the window moves vertically. That is, this point is a final parking line intersecting point. The parking line intersecting points may be searched at the same position even though the image rotates.

The parking line intersecting point passing through the parking line (red solid line) is finally selected by detecting the intersecting point having the brightness pattern characteristics of the parking line intersecting point (as illustrated in FIG. 5C, an A type and a B type for an L-letter shaped connection point and a T-letter shaped connection point are present).

For example, the A type includes a corner having the brightness pattern characteristics in an order of black (left)—white (right). The B type includes a corner having the brightness pattern characteristics in an order of white (left)—black (right). The L-letter shaped intersecting point includes the A type and the B type. The T-letter shaped intersecting point includes at least two B types.

FIGS. 6A and 6B is a block diagram illustrating a test result of the method for detecting a parking line intersecting point according to the exemplary embodiment of the present invention.

FIGS. 7A to 7C are block diagrams illustrating a method for compensating for a rotating error of its own vehicle according to an exemplary embodiment of the present invention.

Referring to FIGS. 7A to 7C, a rotating angle of its own vehicle is estimated by calculating an angle difference between the parking line on the parking division map detected and stored from the previous AVM image and the parking line detected from the current AVM image. The error of the rotating angle of the vehicle may be corrected by comparing the estimated rotating angle of its own vehicle and the rotating angle estimated by the differential odometry.

FIGS. 8A to 8D are block diagrams and flow charts illustrating the method for compensating for a moving error of its own vehicle according to an exemplary embodiment of the present invention.

Figure 8A:
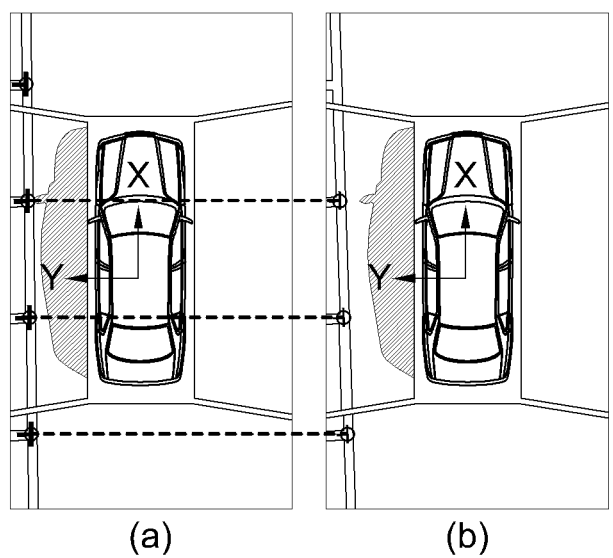

Referring to FIGS. 8A and 8B, the moving amount of its own vehicle is estimated by calculating the moving amounts of the parking intersecting point on the parking division map detected and stored from the previous AVM image and the parking intersecting point detected from the current AVM image.

Figure 8C:
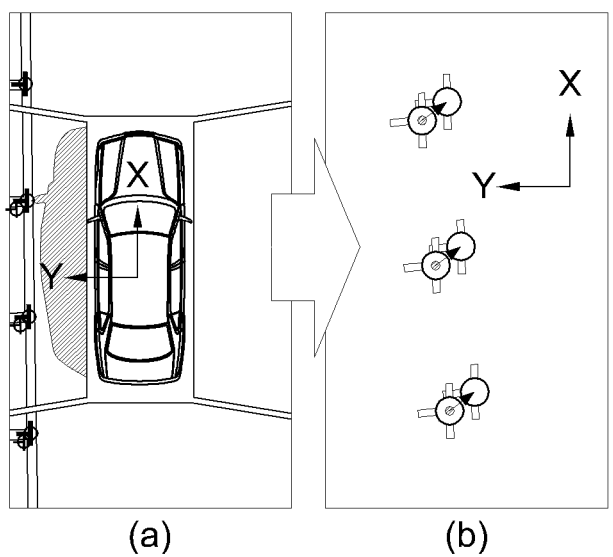
Figure 8D:
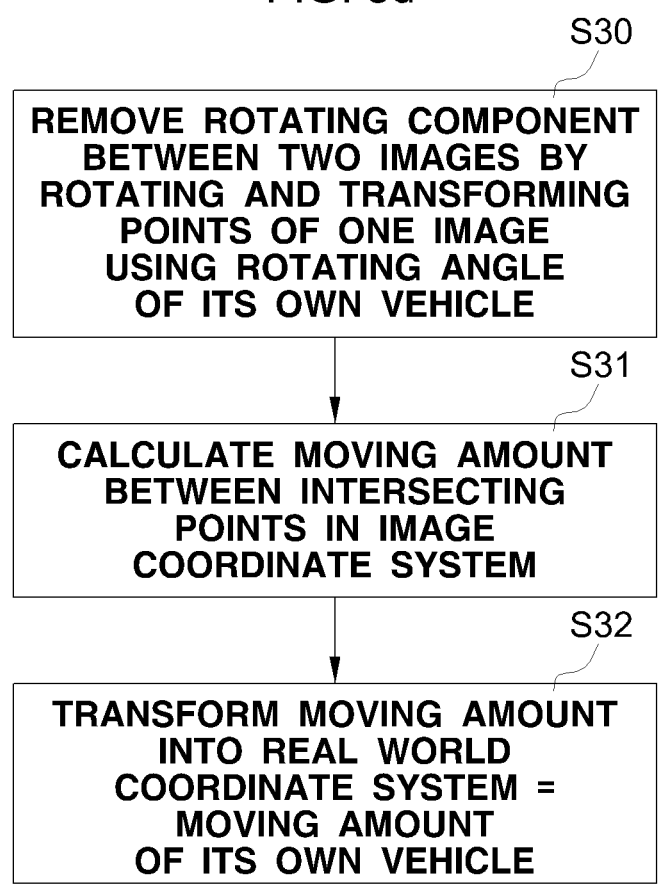

Referring to FIG. 8C, to estimate the moving amount, first, at least two parking line intersecting points passing through the parking line (red solid line) are finally selected by detecting the parking line intersecting points having the brightness pattern characteristics of a parking division corner type (as illustrated in FIG. 8C, an A type and a B type for an L-letter shaped connection point and a T-letter shaped connection point are present) as illustrated in FIGS. 5A to 5C (S21).

The moving amount of its own vehicle is estimated by matching at least two parking line intersecting points finally selected.

In more detail, the rotating component between the consecutive two images is removed by rotating and transforming the intersecting points of one image (a) using the rotating angle of its own vehicle estimated in FIG. 8B (S30). In an image coordinate system, the moving amount between the intersecting points is calculated (S31). The moving amount of its own vehicle is calculated by transforming the calculated moving amount into a real world coordinate system (S32).

The error of the moving amount (position) of the vehicle may be corrected by comparing the estimated moving amount of its own vehicle with the moving amount estimated by the differential odometry.

The exemplary embodiments of the present invention may be implemented not only by the apparatus and/or the method as described above but also may be implemented by a program, or a recording medium recorded with the program, for realizing the functions corresponding to the configuration of the exemplary embodiment of the present invention and may be easily implemented by a person having ordinary skill in the art to which the present invention pertains from the descriptions of the foregoing exemplary embodiment.

Those skilled in the art will appreciate that various modifications, additions and substitutions are possible, without departing from the scope and spirit of the invention and therefore the present invention is not limited to the foregoing embodiments and the accompanying drawings, but all or a part of each of the embodiments may be selectively combined and configured to be variously changed.

What is claimed is:

1. A method for controlling a steering wheel, comprising:
   detecting, from a first image composed from images input from a plurality of cameras equipped in a vehicle, a parking line and at least two intersecting points intersecting the parking line;
   detecting, based on the first image and a second image obtained after the first image, a rotating amount of the vehicle and a moving amount of the vehicle;
   compensating, based on the detected rotating amount and the detected moving amount, for a rotating angle error of the vehicle and a moving error of the vehicle, wherein the rotating angle error and the moving error are due to information obtained from at least one of an odometer or a wheel sensor;
   constructing an obstacle map by reflecting the compensated rotating angle error and the compensated moving error; and
   controlling the steering wheel based on the constructed obstacle map,
   wherein, in the detecting of the rotating amount and the moving amount, the parking line from the first image and a parking line from the second image are detected and a rotating amount of the vehicle is detected from an angle difference between the parking line from the first image and the parking line from the second image.

2. The method of claim 1, further comprising:
correcting for the rotating angle error of the vehicle by comparing the detected rotating amount with a rotating amount estimated based on the information obtained from at least one of the odometer or the wheel sensor.

3. The method of claim 1, wherein in the detecting of the rotating amount and the moving amount, a rotating component is removed by rotating and transforming any one of the at least two intersecting points intersecting the parking line detected from the first image and another at least two intersecting points intersecting the parking line detected from the second image and then moving amounts of the at least two intersecting points and the other intersecting points are detected.

4. The method of claim 3, wherein each intersecting point intersects the parking line in an L-letter shape or a T-letter shape, and has a brightness pattern characteristic corresponding to the L-letter shape or the T-letter shape.

5. The method of claim 3, further comprising:
correcting for the moving error of the vehicle by comparing the detected moving amount with a moving amount estimated based on the information obtained from at least one of the odometer or the wheel sensor.

6. An apparatus for controlling a steering wheel, comprising:
an around view monitor (AVM) system comprising a plurality of cameras equipped in a vehicle and configured to compose and display images input from the cameras;
an obstacle map constructing system configured to:
detect, from a first image obtained by composing images input from the plurality of cameras, a parking line and at least two intersecting points intersecting the parking line,
detect, from the first image and a second image obtained after the first image, a rotating amount of the vehicle and a moving amount of the vehicle,
compensate, based on the detected rotating amount and the detected moving amount, for a rotating angle error of the vehicle and a moving error of the vehicle, wherein the rotating angle error and the moving error are due to information obtained from at least one of an odometer or a wheel sensor, and
reflect the compensated rotating angle error and the compensated moving error; and
a steering wheel system configured to control the steering wheel based on the constructed obstacle map,
wherein the obstacle man constructing system is configured to detect the parking line from the first image and a parking line from the second image and detect a rotating amount of the vehicle from an angle difference between the parking line from the first image and the parking line from the second image.

7. The apparatus of claim 6, wherein the obstacle map constructing system is configured to correct for the rotating angle error of the vehicle by comparing the detected rotating amount with a rotating amount estimated based on the information obtained from at least one of the odometer or the wheel sensor.

8. The apparatus of claim 6, wherein the obstacle map constructing system is configured to remove a rotating component by rotating and transforming any one of the at least two intersecting points intersecting the parking line detected from the first image and another at least two intersecting points intersecting the parking line detected from the second image and detect moving amounts of the first intersecting points and the second intersecting points.

9. The apparatus of claim 8, wherein each intersecting point intersects the parking line in an L-letter shape or a T-letter shape, and has a brightness pattern characteristic corresponding to the L-letter shape or the T-letter shape.

10. The apparatus of claim 8, wherein the moving error of the vehicle is corrected by comparing the detected moving amount with a moving amount estimated based on the information obtained from at least one of the odometer or the wheel sensor.

11. A method for constructing an obstacle map for supporting a parking, comprising:
detecting, from a first image composed from images input from a plurality of cameras equipped in a vehicle, a parking line and at least two intersecting points intersecting the parking line;
detecting, based on the first image and a second image obtained after the first image, a rotating amount of the vehicle and a moving amount of the vehicle;
compensating, based on the detected rotating amount and the detected moving amount, for a rotating angle error of the vehicle and a moving error of the vehicle, wherein the rotating angle error and the moving error are due to information obtained from at least one of an odometer or a wheel sensor; and
constructing the obstacle map by reflecting the compensated rotating angle error and the compensated moving error,
wherein, in the detecting of the rotating amount and the moving amount, the parking line from the first image and a parking line from the second image are detected and a rotating amount of the vehicle is detected from an angle difference between the parking line from the first image and the parking line from the second image.

12. The method of claim 11, wherein in the detecting of the rotating amount and the moving amount, a rotating component is removed by rotating and transforming any one of the at least two intersecting points intersecting the parking lines detected from the first image and another at least two intersecting points intersecting the parking lines detected from the second image and then moving amounts of the at least two intersecting points and the other intersecting points are detected.

* * * * *